United States Patent
Ray et al.

(10) Patent No.: US 11,268,729 B2
(45) Date of Patent: Mar. 8, 2022

(54) BUILDING MANAGEMENT SYSTEM WITH APPARENT INDOOR TEMPERATURE AND COMFORT MAPPING

(71) Applicant: Johnson Controls Technology Company, Auburn Hills, MI (US)

(72) Inventors: Soumyadeep Ray, Pune (IN); Sayan Chakraborty, Brookfield, WI (US); Milan Mitra, Milwaukee, WI (US); Anjani Kumari, Pune (IN)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 0 days.

(21) Appl. No.: 16/403,716

(22) Filed: May 6, 2019

(65) Prior Publication Data

US 2019/0338975 A1  Nov. 7, 2019

Related U.S. Application Data

(60) Provisional application No. 62/667,905, filed on May 7, 2018.

(51) Int. Cl.
*F24F 11/523* (2018.01)
*F24F 11/63* (2018.01)
(Continued)

(52) U.S. Cl.
CPC ............ *F24F 11/523* (2018.01); *F24F 11/63* (2018.01); *G05B 19/042* (2013.01);
(Continued)

(58) Field of Classification Search
CPC .......... F24F 11/523; F24F 11/63; F24F 11/30; F24F 2120/14; F24F 11/72; G05B 2219/25011
See application file for complete search history.

(56) References Cited

U.S. PATENT DOCUMENTS 5,058,388 A * 10/1991 Shaw ...................... F24F 3/044
62/93
5,819,242 A * 10/1998 Matsuoka ............ G06N 3/0436
706/2

(Continued)

OTHER PUBLICATIONS

Ambi, "Find out How AI Can Boost Your Thermal Comfort to the Max", 2017, https://www.ambiclimate.com/en/blog/2017/11/29/find-out-how-a-i-can-boost-your-thermal-comfort-to-the-max/ (Year: 2017).*

(Continued)

*Primary Examiner* — M. N. Von Buhr
(74) *Attorney, Agent, or Firm* — Foley & Lardner LLP

(57) ABSTRACT

A method for providing environmental comfort includes obtaining measurements of a dry bulb temperature, a relative humidity, and an airflow rate for an indoor space, calculating an apparent temperature for the indoor space using the measurements, and generating a visualization comprising a comfort band and a value of each of the apparent temperature, the dry bulb temperature, the relative humidity, and the airflow rate for the indoor space plotted relative to the comfort band along independent axes. The method also includes controlling building equipment to drive the value of one or more of the apparent temperature, the dry bulb temperature, the relative humidity, or the airflow rate into the comfort band.

21 Claims, 12 Drawing Sheets

(51) Int. Cl.
  *G05B 19/042* (2006.01)
  *F24F 120/14* (2018.01)
  *F24F 110/10* (2018.01)
  *F24F 110/20* (2018.01)
  *F24F 110/30* (2018.01)

(52) U.S. Cl.
  CPC ....... *F24F 2110/10* (2018.01); *F24F 2110/20* (2018.01); *F24F 2110/30* (2018.01); *F24F 2120/14* (2018.01); *G05B 2219/25011* (2013.01); *G05B 2219/2614* (2013.01)

(56) References Cited

U.S. PATENT DOCUMENTS

| | | | |
|---|---|---|---|
| 8,700,227 B2* | 4/2014 | Vass | G01W 1/17 700/300 |
| 2014/0277756 A1* | 9/2014 | Bruce | G05D 23/1902 700/276 |
| 2016/0097554 A1* | 4/2016 | Lyons | F24F 11/30 73/861.85 |
| 2019/0041883 A1* | 2/2019 | Clark | G06F 1/3231 |
| 2019/0103182 A1* | 4/2019 | Borshch | G16H 20/30 |
| 2019/0107309 A1* | 4/2019 | Assouad | F24F 11/80 |
| 2019/0246977 A1* | 8/2019 | Miller | A61B 5/14546 |

OTHER PUBLICATIONS

Von Seidlein et al. "Airflow attenuation and bed net utilization: observations from Africa and Asia", Malaria Journal, 2012, 11:200. http://www.malariajournal.com/content/11/1/200 (accessed May 20, 2021).*

* cited by examiner

700 ↘

| T-Dry Bulb In deg F | CFM | Air Speed | RH | T-App in Deg F | Zone Feels Cool | Zone Feels Warm |
|---|---|---|---|---|---|---|
| 68 | 0 | 0.0 | 50 | 68.1 | TRUE | FALSE |
| 69 | 80 | 0.1 | 50 | 69.3 | TRUE | FALSE |
| 70 | 160 | 0.2 | 50 | 70.4 | FALSE | FALSE |
| 71 | 240 | 0.3 | 50 | 71.5 | FALSE | FALSE |
| 72 | 320 | 0.4 | 50 | 72.7 | FALSE | FALSE |
| 73 | 400 | 0.5 | 50 | 73.8 | FALSE | FALSE |
| 74 | 480 | 0.6 | 50 | 75.0 | FALSE | TRUE |
| 75 | 560 | 0.7 | 50 | 76.2 | FALSE | TRUE |
| 76 | 640 | 0.8 | 50 | 77.4 | FALSE | TRUE |
| 77 | 720 | 0.9 | 50 | 78.6 | FALSE | TRUE |
| 78 | 800 | 1.0 | 50 | 79.8 | FALSE | TRUE |

| T-Dry Bulb In deg F | CFM | Air Speed | RH | T-App in Deg F | Zone Feels Cool | Zone Feels Warm |
|---|---|---|---|---|---|---|
| 72 | 0 | 0.0 | 30 | 69.8 | TRUE | FALSE |
| 72 | 80 | 0.1 | 30 | 69.7 | TRUE | FALSE |
| 72 | 160 | 0.2 | 30 | 69.6 | TRUE | FALSE |
| 72 | 240 | 0.3 | 30 | 69.5 | TRUE | FALSE |
| 72 | 320 | 0.4 | 30 | 69.3 | TRUE | FALSE |
| 72 | 400 | 0.5 | 30 | 69.2 | TRUE | FALSE |
| 72 | 480 | 0.6 | 30 | 69.1 | TRUE | FALSE |
| 72 | 560 | 0.7 | 30 | 69.0 | TRUE | FALSE |
| 72 | 640 | 0.8 | 30 | 68.8 | TRUE | FALSE |
| 72 | 720 | 0.9 | 30 | 68.7 | TRUE | FALSE |
| 72 | 800 | 1.0 | 30 | 68.6 | TRUE | FALSE |

| T-Dry Bulb In deg F | CFM | Air Speed | RH | T-App in Deg F | Zone Feels Cool | Zone Feels Warm |
|---|---|---|---|---|---|---|
| 72 | 0 | 0.0 | 60 | 74.9 | FALSE | TRUE |
| 72 | 80 | 0.1 | 60 | 74.7 | FALSE | TRUE |
| 72 | 160 | 0.2 | 60 | 74.6 | FALSE | TRUE |
| 72 | 240 | 0.3 | 60 | 74.5 | FALSE | TRUE |
| 72 | 320 | 0.4 | 60 | 74.4 | FALSE | TRUE |
| 72 | 400 | 0.5 | 60 | 74.2 | FALSE | TRUE |
| 72 | 480 | 0.6 | 60 | 74.1 | FALSE | TRUE |
| 72 | 560 | 0.7 | 60 | 74.0 | FALSE | FALSE |
| 72 | 640 | 0.8 | 60 | 73.9 | FALSE | FALSE |
| 72 | 720 | 0.9 | 60 | 73.7 | FALSE | FALSE |
| 72 | 800 | 1.0 | 60 | 73.6 | FALSE | FALSE |

FIG. 9

BUILDING MANAGEMENT SYSTEM WITH APPARENT INDOOR TEMPERATURE AND COMFORT MAPPING

CROSS-REFERENCE TO RELATED APPLICATION

This application claims the benefit of and priority to U.S. Patent Application No. 62/667,905, filed May 7, 2018, the entire disclosure of which is incorporated by reference herein.

BACKGROUND

The present disclosure relates generally to a building management system (BMS) and more particularly to a BMS with enterprise management and reporting. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

SUMMARY

One implementation of the present disclosure is a building management system. The building management system includes a dry bulb temperature sensor, a humidity sensor, an airflow meter, and a controller. The controller is configured to calculate an apparent temperature using a dry bulb temperature obtained by the dry bulb temperature sensor, a relative humidity obtained by the humidity sensor, and an airflow rate obtained by the airflow meter. The controller is also configured to generate a visualization of zone comfort. The visualization includes a comfort band and current values of the apparent temperature, the dry bulb temperature, the relative humidity, and the airflow rate relative to the comfort band. The controller is also configured to control building equipment to drive the current values of one or more of the apparent temperature, the dry bulb temperature, the relative humidity, and the airflow rate into the comfort band.

In some embodiments, the comfort band defines a range of comfortable values for each of dry bulb temperature, relative humidity, airflow rate, and apparent temperature. In some embodiments, the visualization includes a pentagonal chart. Each corner of the pentagonal chart corresponds to a parameter, each corner is joined to the center of the pentagonal chart by an axis on which a current value of the corresponding parameter is plotted, and a polygonal perimeter connects the current values of the parameters.

In some embodiments, the parameters include apparent temperature, dry bulb temperature, relative humidity, air speed, and airflow rate. In some embodiments, the comfort band is formed as a polygonal band such that the polygonal perimeter is within the comfort band when the current values of the parameters are within the comfort band.

In some embodiments, the controller is configured calculate the apparent temperature using a formula including scaling parameters.

In some embodiments, the controller is configured to calculate an airspeed in a space as a function of the airflow rate obtained by the airflow meter and a volume of the space and calculate the apparent temperature using the airspeed.

In some embodiments, the controller is configured to calculate the apparent temperature using a look-up table that maps values of the dry bulb temperature, the relative humidity, and the airflow rate to values of the apparent temperature. In some embodiments, the airflow meter is configured to obtain the airflow rate based on settings for a variable air volume unit.

Another implementation of the present disclosure is a method for providing environmental comfort. The method includes obtaining measurements of a dry bulb temperature, a relative humidity, and an airflow rate for an indoor space. The method also includes calculating an apparent temperature for the indoor space using the measurements, and generating a visualization that includes a comfort band and a value of each of the apparent temperature, the dry bulb temperature, the relative humidity, and the airflow rate for the indoor space. The method also includes controlling building equipment to drive the value of one or more of the apparent temperature, the dry bulb temperature, the relative humidity, or the airflow rate into the comfort band.

In some embodiments, generating the visualization includes generating a pentagonal chart such that each corner of the pentagonal chart corresponds to a parameter, each corner is joined to the center of the pentagonal chart by an axis on which a current value of the corresponding parameter is plotted, and a polygonal perimeter connects the current values of the parameters. In some embodiments, the parameters include apparent temperature, dry bulb temperature, relative humidity, air speed, and airflow rate. In some embodiments, the comfort band is formed as a pentagonal band such that the pentagonal perimeter is within the comfort band when the current values of the parameters are within the comfort band.

In some embodiments, calculating an apparent temperature for the indoor space using the measurements includes calculating an airspeed for the indoor space as a function of the airflow rate and a volume of the indoor space and calculating the apparent temperature based on the airspeed.

Another implementation of the present disclosure is one or more non-transitory computer-readable media containing program instructions that, when executed by one or more processors, cause the one or more processors to perform operations. The operations include obtaining measurements of a dry bulb temperature, a relative humidity, and an airflow rate for an indoor space, calculating an apparent temperature for the indoor space using the measurements, generating a visualization that includes a comfort band and a value of each of the apparent temperature, the dry bulb temperature, the relative humidity, and the airflow rate for the indoor space, and controlling building equipment to drive the value of one or more of the apparent temperature, the dry bulb temperature, the relative humidity, or the airflow rate into the comfort band.

In some embodiments, the comfort band defines a range of comfortable values for each of dry bulb temperature, relative humidity, airflow rate, and apparent temperature. In some embodiments, generating the visualization includes generating a pentagonal chart. Each corner of the pentagonal chart may correspond to a parameter. Each corner may be joined to the center of the pentagonal chart by an axis on which a current value of the corresponding parameter can be plotted. A polygonal perimeter may connect the current values of the parameters.

In some embodiments, the parameters include apparent temperature, dry bulb temperature, relative humidity, air speed, and airflow rate. The comfort band is formed as a pentagonal band such that the polygonal perimeter is within the comfort band when the current values of the parameters are within the comfort band.

BRIEF DESCRIPTION OF THE DRAWINGS

FIG. 7 is a first table showing associations between air temperature, zone airflow, air speed, room humidity, apparent temperature, and zone comfort, according to an exemplary embodiment.

FIG. 8 is a second table showing associations between air temperature, zone airflow, air speed, room humidity, apparent temperature, and zone comfort, according to an exemplary embodiment.

FIG. 9 is a third table showing associations between air temperature, zone airflow, air speed, room humidity, apparent temperature, and zone comfort, according to an exemplary embodiment.

DETAILED DESCRIPTION

Building HVAC Systems and Building Management Systems

Figure 1:
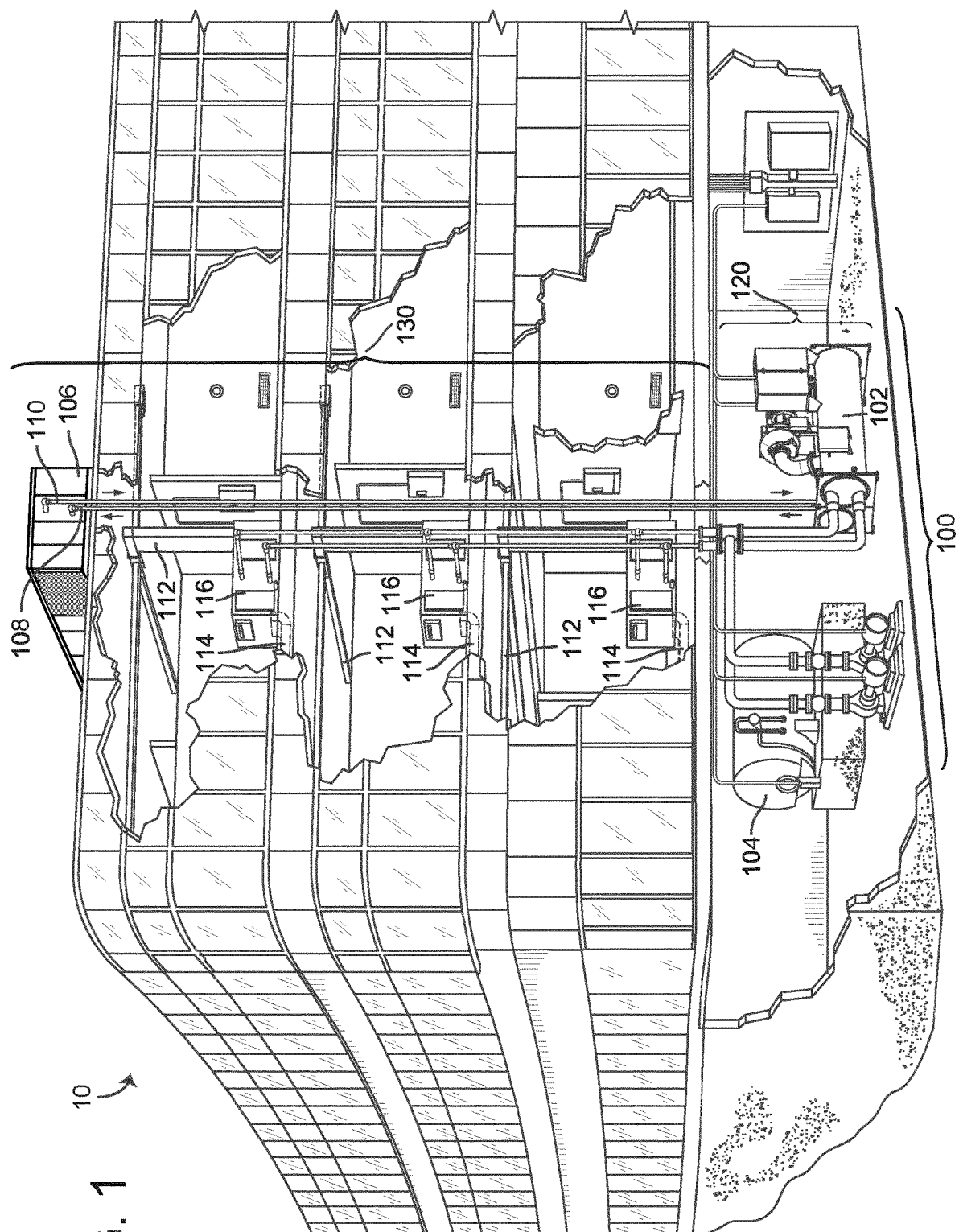
FIG. 1 is a drawing of a building equipped with a HVAC system, according to an exemplary embodiment.
Figure 2:
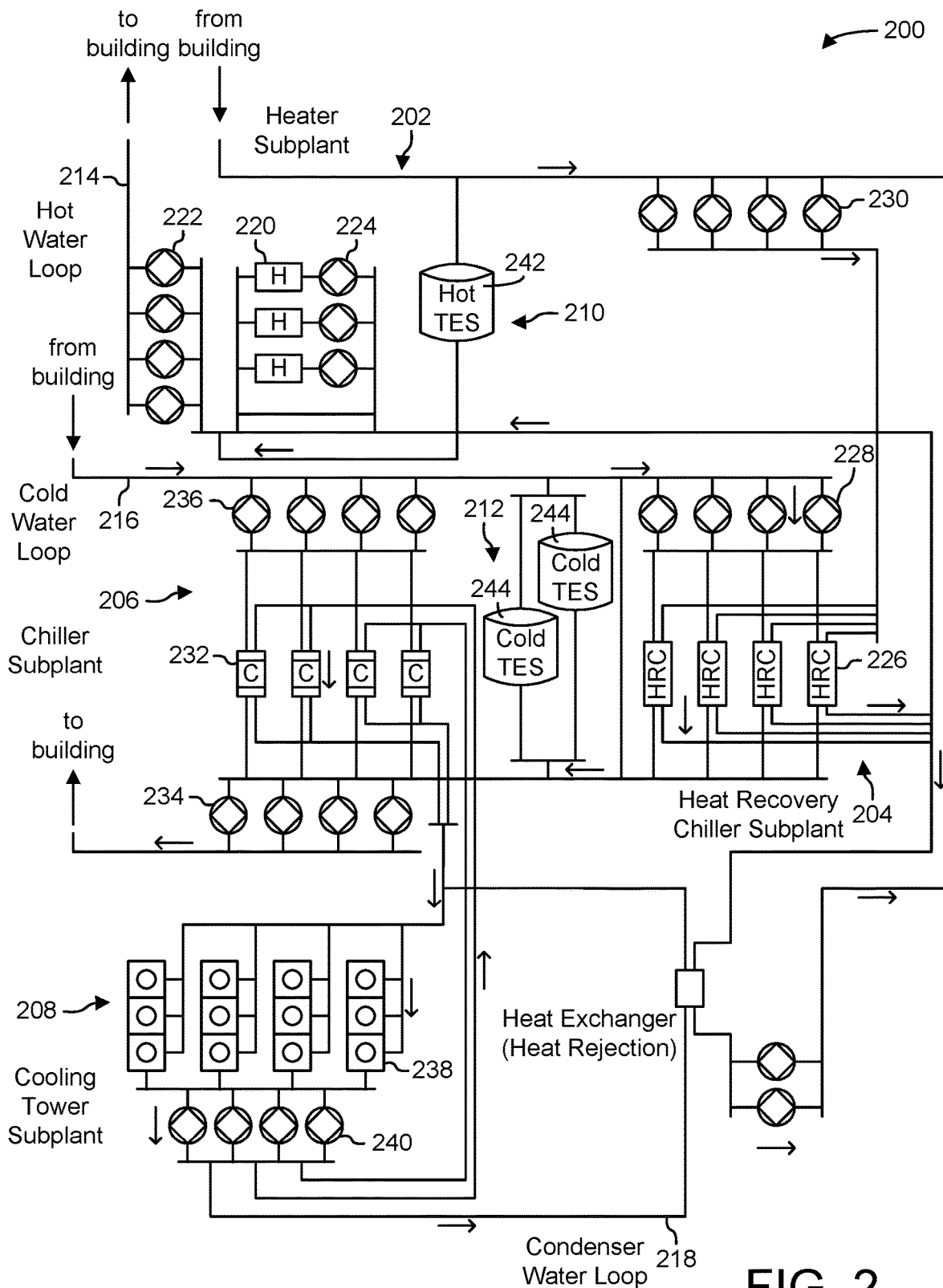
FIG. 2 is a block diagram of a waterside system which can be used to serve the building of FIG. 1, according to an exemplary embodiment.
Figure 3:
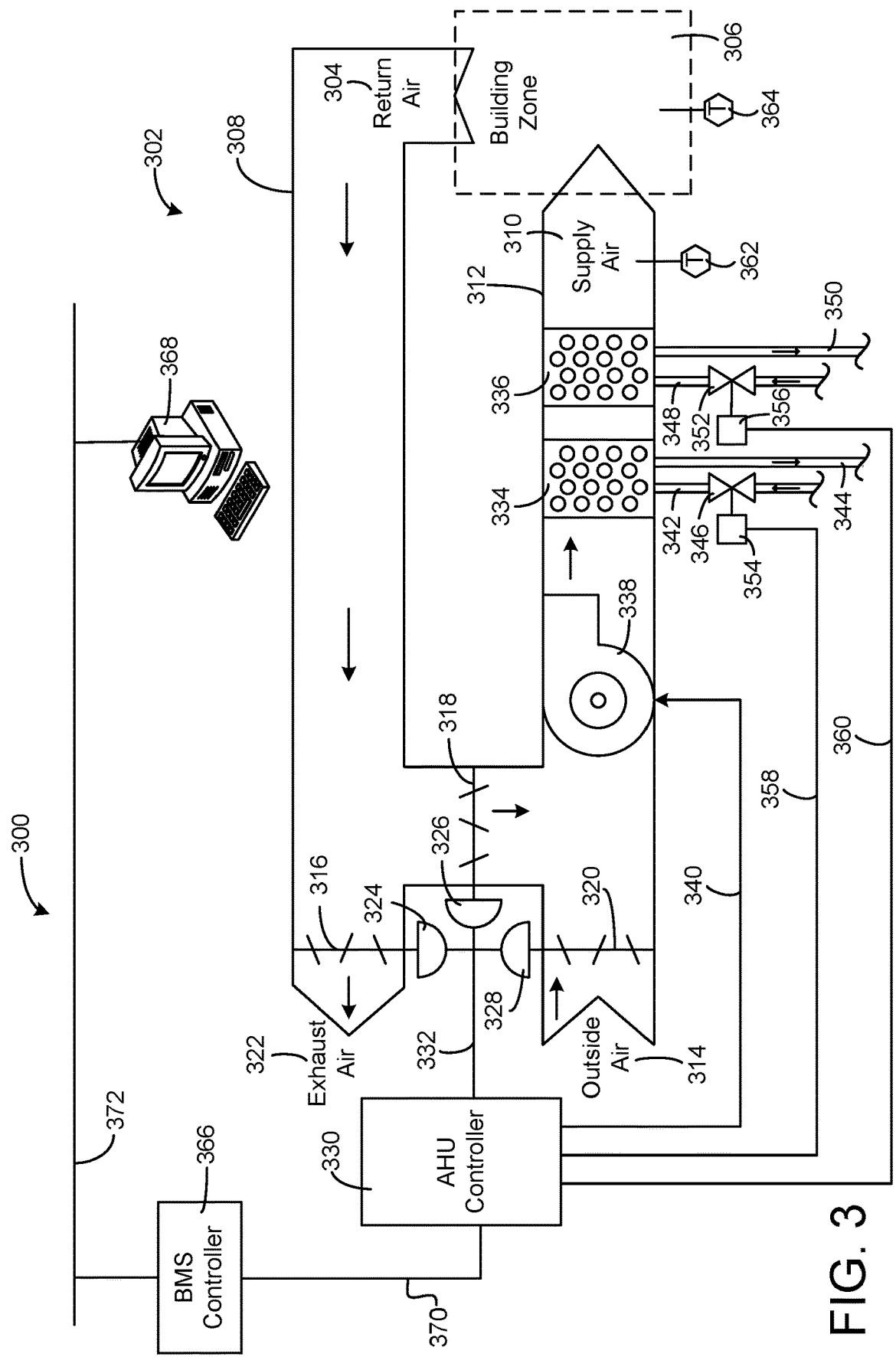
FIG. 3 is a block diagram of an airside system which can be used to serve the building of FIG. 1, according to an exemplary embodiment.
Figure 4:
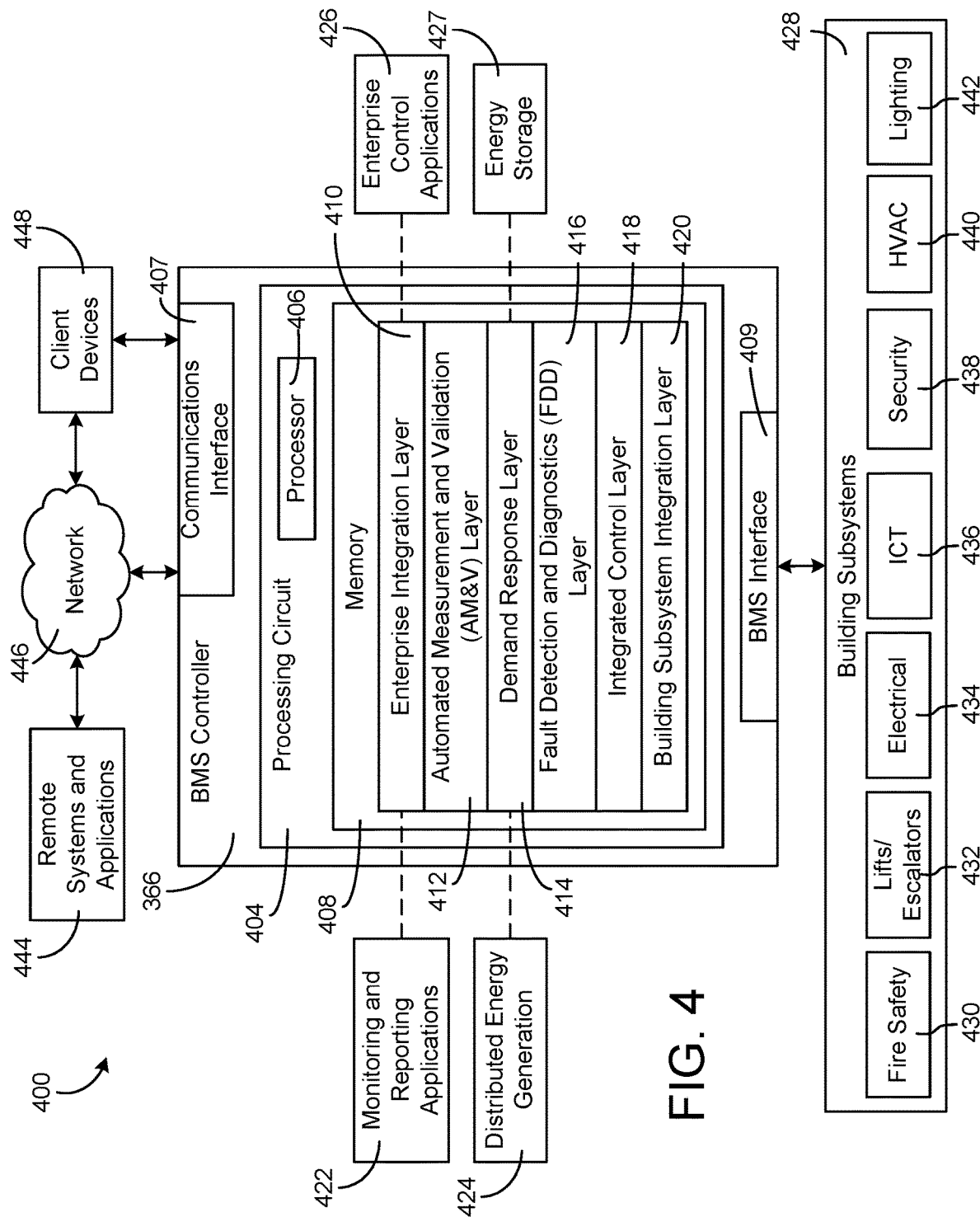
FIG. 4 is a block diagram of a building management system (BMS) which can be used to monitor and control the building of FIG. 1, according to an exemplary embodiment.
Figure 5:
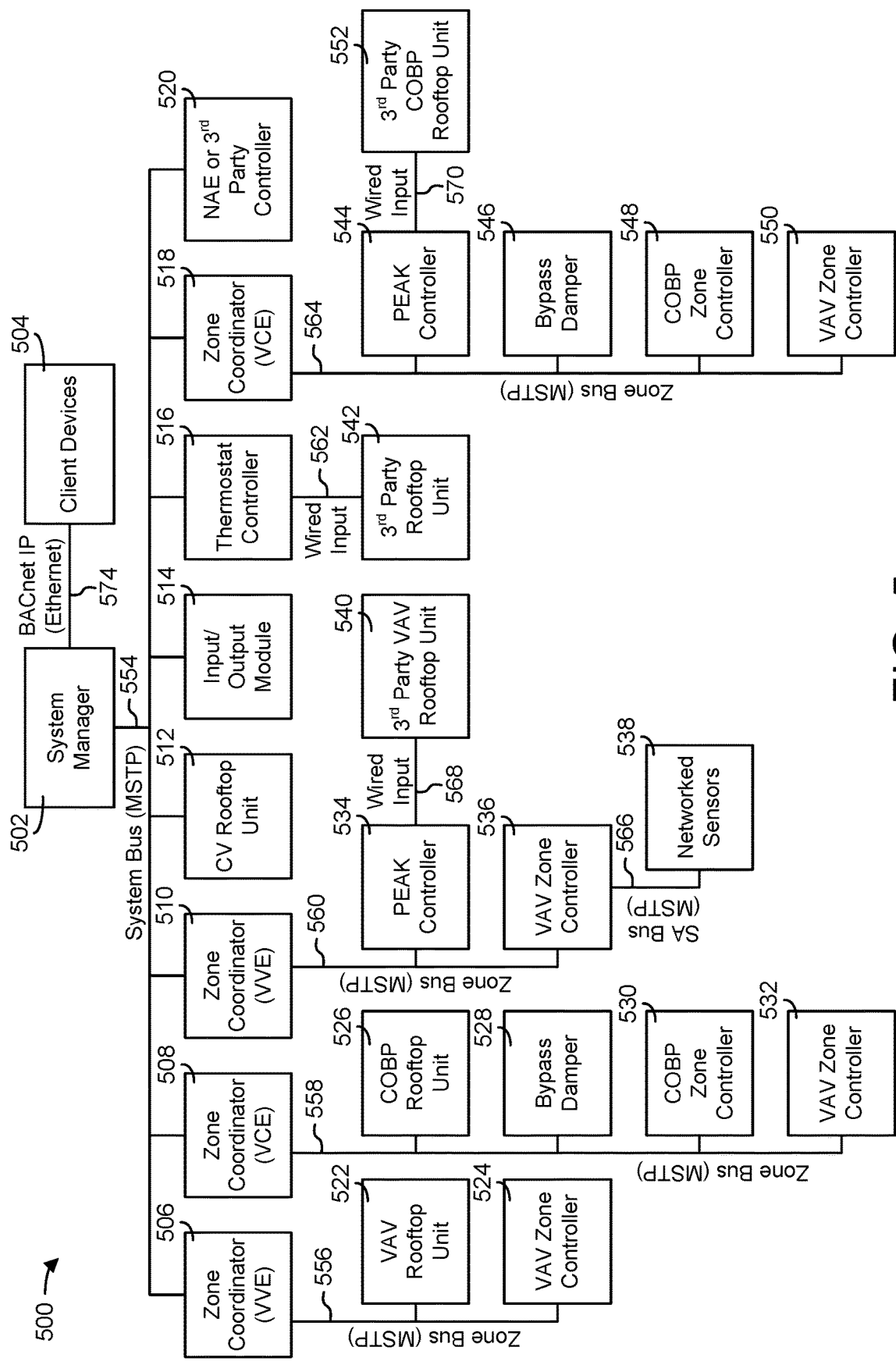
FIG. 5 is a block diagram of another BMS which can be used to monitor and control the building of FIG. 1, according to an exemplary embodiment.

Referring now to FIGS. 1-5, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10. FIG. 5 is a block diagram of another BMS which can be used to monitor and control building 10.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314.

AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management Systems

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/output module (IOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Building Management System Using Apparent Temperature

Conventional HVAC systems rely primarily on dry bulb temperature measurements for controlling and managing HVAC equipment. In a dry bulb temperature sensor, the temperature sensor is shielded from radiation and moisture, such that a temperature measurement of the air obtained is independent of radiation, humidity, or air speed. The present disclosure notes that even indoors, the effects of humidity and air speed may substantially impact the perception that occupants have of the air temperature in a building zone. The systems and methods shown in FIGS. 6-14 and described in detail below reduce or eliminate this disconnect between the temperature used by a conventional HVAC system and the apparent temperature perceived by people in a building zone.

Figure 6:
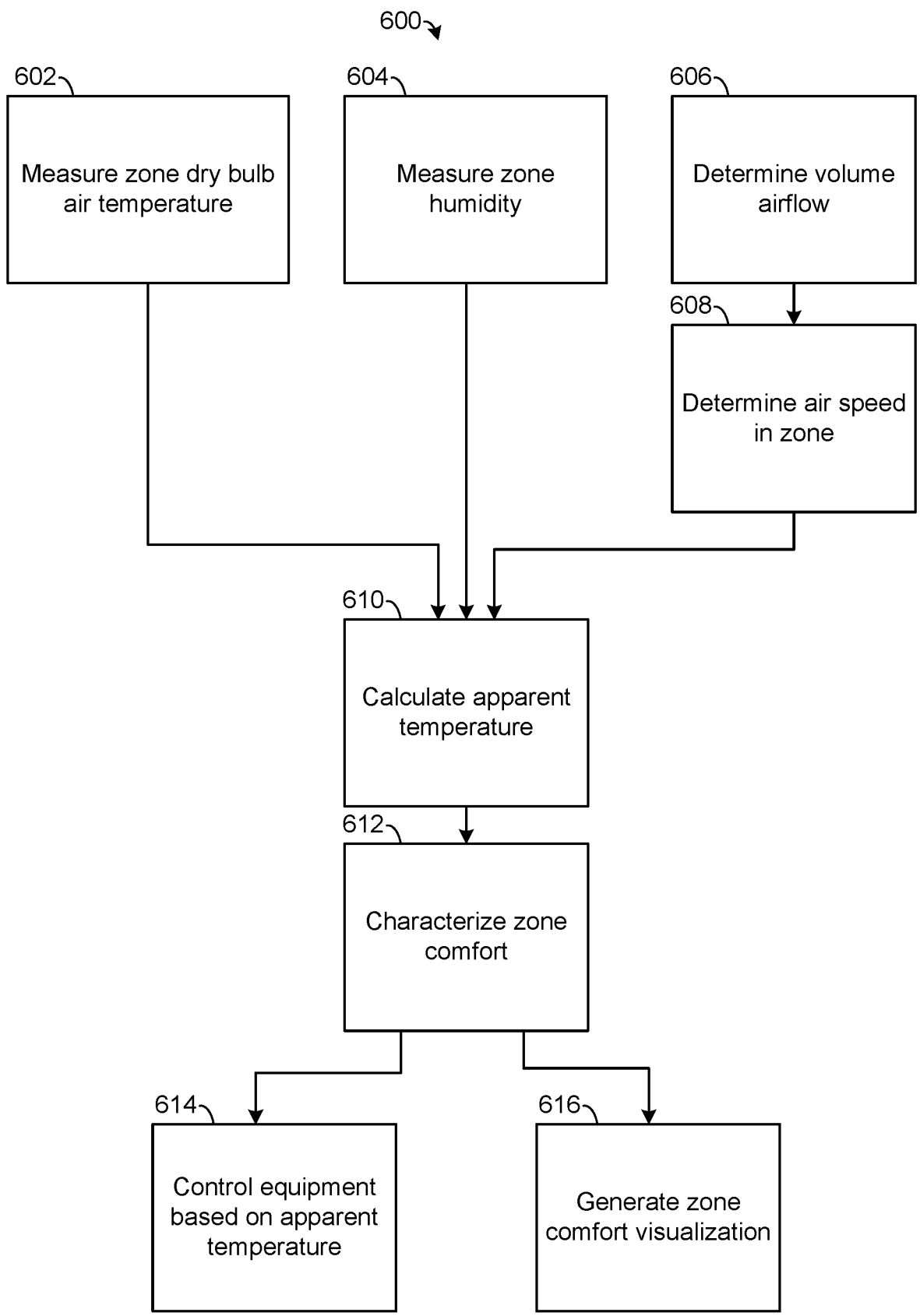
FIG. 6 is a flowchart of a process for determining and utilizing an apparent temperature for a building zone, according to an exemplary embodiment.

Referring now to FIG. 6, a flowchart of a process 600 for calculating and utilizing apparent temperature of a building zone for managing a building is shown, according to an exemplary embodiment. Process 600 may be carried out by the system manager 502 of FIG. 5, for example, and reference is made thereto in the following description of process 600. In various embodiments, process 600 may also be carried out by one or more zone controllers (e.g., zone controllers 524, 530, 532, 536, 548, 550), thermostats, room air conditioners, packaged air conditioners, window air conditioners, and/or various other devices and equipment operable to affect temperature, humidity, or air flow in a building zone.

At step 602, the dry bulb air temperature of a building zone is measured. The dry bulb air temperature may be measured by one or more dry bulb temperature sensors located in the building to obtain a measured dry bulb air temperature. The measured dry bulb temperature sensor may then be transmitted to the system manager 502. The dry bulb temperature sensor may be included with network sensors 538 shown in FIG. 5.

At step 604, the humidity of the building zone is measured. The humidity may be measured as relative humidity by one or more humidity sensor. The humidity sensor may provide the humidity measurement to the system manager 502.

At step 606, the volume airflow for the spaces is determined. The volume airflow is the amount of air flowing into or out of a space in a certain amount of time, for example quantified in cubic feet per minute (CFM). In an embodiment where the building zone is served by a VAV unit (e.g., one or more of VAV units 116), the volume airflow through the VAV unit may be controlled (and thus known) by a controller for the VAV unit (e.g., by a VAV zone controller 524) and provided to the system manager 502. In some embodiments, the volume airflow through the VAV unit is determined based on the minimum and maximum flow rates for the VAV unit (e.g., provided by a manufacturer) and the position of a damper that varies the flow rate between the minimum and maximum flow rates. In some embodiments, one or more sensors provide data that can be process by the system manager 502 to determine the volume airflow.

At step 608, the system manager 502 determines the air speed in the building zone. The air speed in the building zone is the velocity at which air moves through the space, analogous to outdoor wind speed. In preferred embodiments, the air speed in the building zone is the velocity of the air perceived by occupants in the zone, i.e., the air speed at positions in the building zone where an occupant is likely to be. In the embodiment shown in FIG. 6, air speed is calculated based on the volume airflow determined at step 606 and a known configuration of the building zone. For example, the air speed may be determined by dividing the volume airflow by the volume of the room. The air speed may also be determined based on some other arithmetic relationship between volume airflow and air speed. In some embodiments, the air speed may be determined by modelling the flow of air throughout the building zone to estimate air speed at one or more points in the zone. In some embodiments, air speed sensors may be included in a building zone and used to measure the air speed.

At step 610, the apparent temperature of the building zone is determined by the system manager 502. The apparent temperature quantifies what the temperature of the zone feels like to an occupant. The system manager 502 may calculate the apparent temperature based on the air speed, the humidity, and the dry bulb temperature of the zone. In some embodiments, the apparent temperature is calculated based on the formula:

$$AT = T_a + 0.33e - 0.70v - 4.00$$

where AT is the apparent temperature in degrees Celsius, $T_a$ is the dry bulb temperature in degrees Celsius, e is the relative humidity, and v is the air speed in meters/second. The constants (scaling parameters) in the formula may be adjusted as needed for a particular building zone. In some embodiments, the constants (scaling parameters) may be determined using a machine learning approach in which user feedback relating to apparent temperature is received and used to automatically tune the scaling parameters to improve the accuracy of the formula in calculating an apparent temperature. For example, a user may be prompted to input (e.g., via a thermostat, via a mobile app, etc.) what the temperature feels like at a given time, which may be used with the measured values of dry bulb temperature, air flow, and humidity to determine values for the scaling parameters, for example using a neural network.

In some embodiments, the apparent temperature is determined using a look-up table of apparent temperatures, dry bulb air temperatures, humidities, and air speeds. Examples of portions of such a look-up table are shown in table 700 of FIG. 7, table 800 of FIG. 8, and table 900 of FIG. 9, according to exemplary embodiments. The values of such look-up tables may be pre-defined and/or learned based on user input as described above.

At step 612, the system manager 502 characterizes the zone comfort (e.g., cold, cool, comfortable, warm, hot) based on the apparent temperature. For example, the system manager 502 may determine whether the apparent temperature is within a set of comfortable apparent temperatures, within a set of cool apparent temperatures, or within a set of warm apparent temperatures. In this example, the zone is characterized as cool if the apparent temperature is within the set of cool apparent temperature, characterized as warm if the apparent temperature is within the set of warm apparent temperatures, and characterized as comfortable if the apparent temperature is within the set of comfortable apparent temperatures. The delineations between the sets may be determined based on demographic information for occupants of the space (e.g., age, gender), preferences of occupants, etc. In some embodiments, the delineations between the sets are learned automatically based on user behavior. For example, user input to a thermostat or other user interface that controls HVAC equipment may be tracked and used to determine when a user is uncomfortable (e.g., a user input to change the temperature in a zone may indicate dissatisfaction with the current apparent temperature). Over time, such data may be used to determine a range of comfortable apparent temperatures and a region of uncomfortably warm or cool apparent temperatures. The characterized zone comfort accordingly corresponds to how an occupant would perceive the comfort of the air temperature in the zone.

The comfort of the zone may also be determined based on some combination of the apparent temperature, the air speed, the airflow volume, and/or the dry bulb temperature. For example, in some cases, a zone may be uncomfortable due to an extreme value of one of the parameters despite a comfortable apparent temperature. For example, a high airspeed may cause a zone to be perceived as overly windy/breezy while a corresponding warm dry bulb temperature keeps the apparent temperature in an acceptable range. In some embodiments, the system manager 502 uses a look-up table to characterize the zone comfort based on a current combination of apparent temperature, air speed, airflow volume, and dry bulb temperature. Examples of portions of such a look-up table are shown in table 700 of FIG. 7, table 800 of FIG. 8, and table 900 of FIG. 9, according to exemplary embodiments.

Process 600 may then proceed to step 614 and/or step 616. At step 614, the system manager 502 uses the apparent temperature and/or the zone comfort to control equipment for the space. For example, the system manager 502 may alter a dry bulb temperature setpoint of HVAC equipment to cause the dry bulb temperature to be altered as needed to achieve a comfortable apparent temperature. The system manager 502 may also control a fan or other airflow device in the building zone to increase or decrease air speed in the zone to decrease or increase the apparent temperature. The system manager 502 may also control a humidifier or dehumidifier to alter the humidity of the building zone to cause the apparent temperature to approach a comfortable apparent temperature. In some embodiments, the system manager 502 determines to alter one or more of the dry bulb air temperature, humidity, or air speed based on which adjustment or combination of adjustments achieves the desired apparent temperature while consuming the least amount of energy or other resource.

In some embodiments, the system manager 502 is configured to sequentially control the air flow, dry bulb temperature, and humidity to achieve the desired apparent temperature. For example, apparent temperature may be adjusted by first controlling airflow in a range between minimum and maximum limits determined by physical limits of the equipment (e.g., VAV unit) that serves a space. In this example, if the desired apparent temperature cannot be achieved by adjust airflow, then the dry bulb temperature setpoint is adjusted to increase or decrease the dry bulb temperature in the space. Further, in this example, if the desired apparent temperature is still not achieved, a humidifier or dehumidifier can be controlled to alter the zone humidity to further adjust the apparent temperature in the zone towards a desired setpoint or range. Constraints on the adjustability of airflow, dry bulb temperature, and humidity may correspond to physical limits of the equipment a space or comfort ranges for occupants (e.g., input by an occupant, learned from occupant feedback, determined from industry standards).

At step 616, the system manager 502 may generate a zone comfort visualization based on the apparent temperature, the zone comfort, and one or more of the dry bulb temperature, zone humidity, volume airflow, and air speed. Examples of the visualization generated at step 616 are shown in FIGS. 10-14 and described in detail below with reference thereto. The system manager 502 may provide the visualization to one or more client device 504 (e.g., laptop, desktop computer, tablet, smartphone) or to a device or equipment that services the building zone (e.g., a thermostat with an interactive display).

Figure 10:
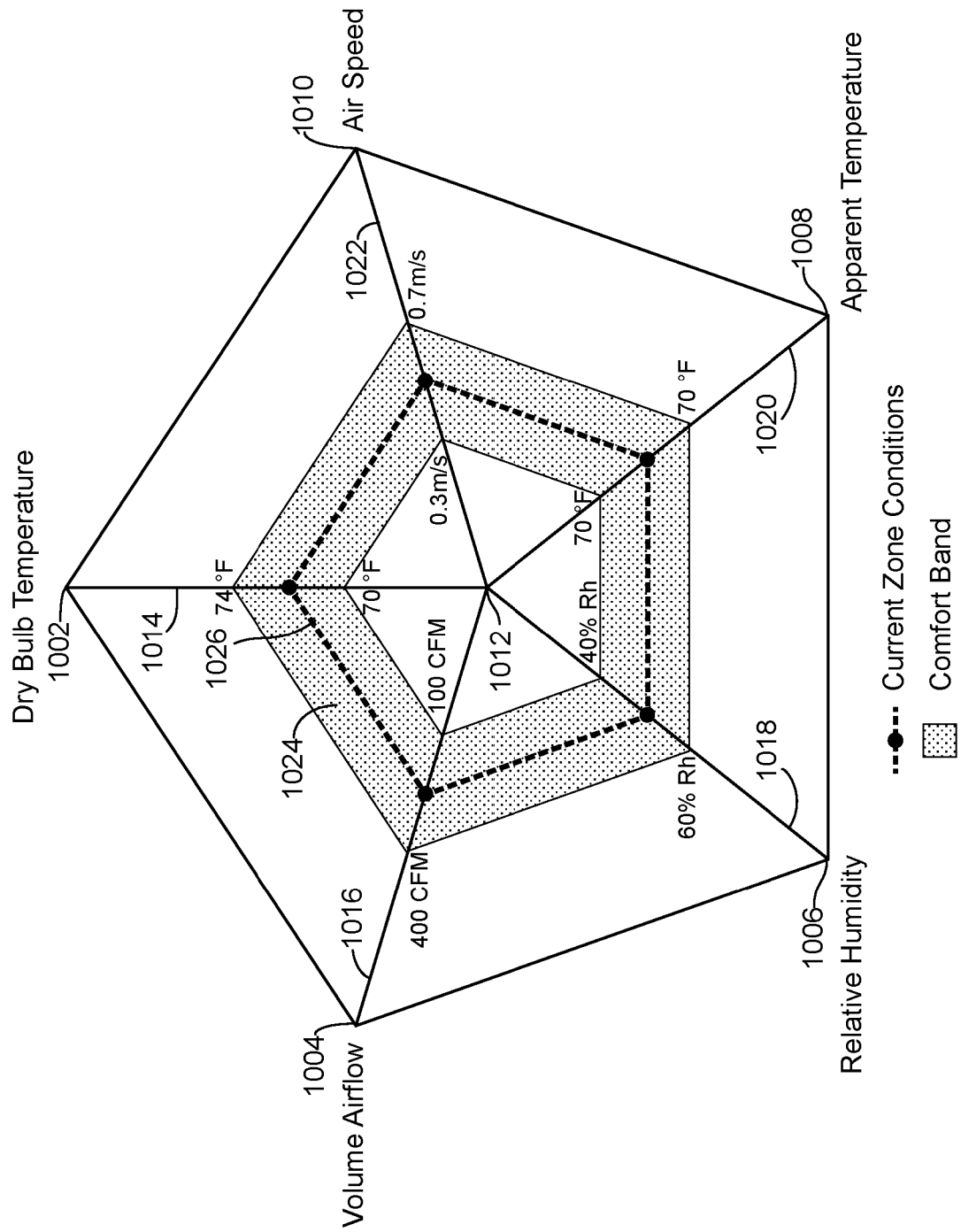
FIG. 10 is an illustration of a comfort map generated by the process of FIG. 6, according to an exemplary embodiment.

Referring now to FIG. 10, a visualization 1000 that visualizes occupant comfort in a building zone and the parameters that contribute to comfort is shown, according to an exemplary embodiment. The visualization 1000 is a pentagonal chart in which each corner of the pentagonal chart corresponds to a parameter considered in process 600. A first corner 1002 corresponds to the dry bulb temperature, a second corner 1004 corresponds to the volume airflow, a third corner 1006 corresponds to the humidity, a fourth corner 1008 corresponds to the apparent temperature, and a fifth corner 1010 corresponds to the air speed. As shown in FIG. 10, the first corner 1002, second corner 1004, third corner 1006, fourth corner 1008, and fifth corner 1010 are positioned to form a regular pentagon. In other embodiments, the corners 1002-1010 are arranged to form some other shape (e.g., an irregular pentagon).

A center point 1012 is positioned equidistant from the corners 1002-1010 (i.e., at the center of the pentagon). An axis runs from the center point 1012 to each of the corners 1002-1010. That is, a dry bulb temperature axis 1014 runs from the center point 1012 to the first corner 1002, a volume airflow axis 1016 runs from the center point 1012 to the second corner 1004, a relative humidity axis 1018 runs from the center point 1012 to the third corner 1006, an apparent temperature axis 1020 runs from the center point 1012 to the fourth corner 1008, and an air speed axis 1022 runs from the center point 1012 to the fifth corner 1010.

Each parameter can be charted along its corresponding axis 1014-1022, such that each point along an axis 1014-1022 represents a value of the corresponding parameter. A point on an axis 1014-1022 closer to the center point 1012 may represent a lower value of the corresponding parameter, while a point on an axis 1014-1022 further from the center point 1012 may represent a higher value of the corresponding parameter.

The range of values represented by each axis 1014-1022 may be scaled based on a typical and/or comfortable range of values for the corresponding parameter. For example, as shown in FIG. 10 each axis 1014-1022 is scaled such that the lowest comfortable value for each parameter is a first distance from the center point 1012 and such that the highest comfortable value for each parameter is a second distance from the center point 1012. A band 1024 can thereby define region of comfortable values for all parameters while also having a regular pentagonal shape. In some embodiments, the band 1024 can be adjusted by a user to alter the comfort range for each parameter along each axis 1014-1022. In other embodiments, the position and alignment of the band 1024 is automatically adjusted to reflect occupant comfort based on a machine learning or other artificial intelligence tool that runs online to learn occupant preferences.

In the visualization 1000, the current value of each parameter is plotted along its corresponding axis 1014-1022. That is, the current dry bulb temperature (e.g., as determined at step 602) is plotted along the dry bulb temperature axis 1014, the current volume airflow (e.g., as determined at step 606) is plotted along the volume airflow axis 1016, the current humidity (e.g., as determined at step 604) is plotted along the relative humidity axis 1018, the current apparent temperature (e.g., as determined at step 610) is plotted along the apparent temperature axis 1020, and the air speed (e.g., as determined at step 608) is plotted along the air speed axis 1022.

The plotted values of the parameters are represented in the visualization by corners of a pentagonal perimeter 1026 that connects the plotted values. As shown in FIG. 10, the pentagonal perimeter 1026 has five sides: a first side 1028 connects the current dry bulb temperature to the current volume airflow, a second side 1030 connects the current volume airflow to the current humidity, a third side connects the current humidity to the current apparent temperature, a fourth side 1032 connects the current apparent temperature to the current air speed, and a fifth side 1034 connects the current air speed to the current dry bulb temperature.

When the pentagonal perimeter 1026 is within the band 1024, the visualization 1000 indicates that the building zone is comfortable for occupants. An example of such a case is shown in FIG. 10. As described with reference to FIG. 11-13, the shape of the pentagonal perimeter 1026 as well as the relative position of the pentagonal perimeter 1026 and the band 1024 may also indicate that the building zone is uncomfortable (e.g., warm, cool) and/or indicate how the comfort of the building zone may be improved.

Figure 11:
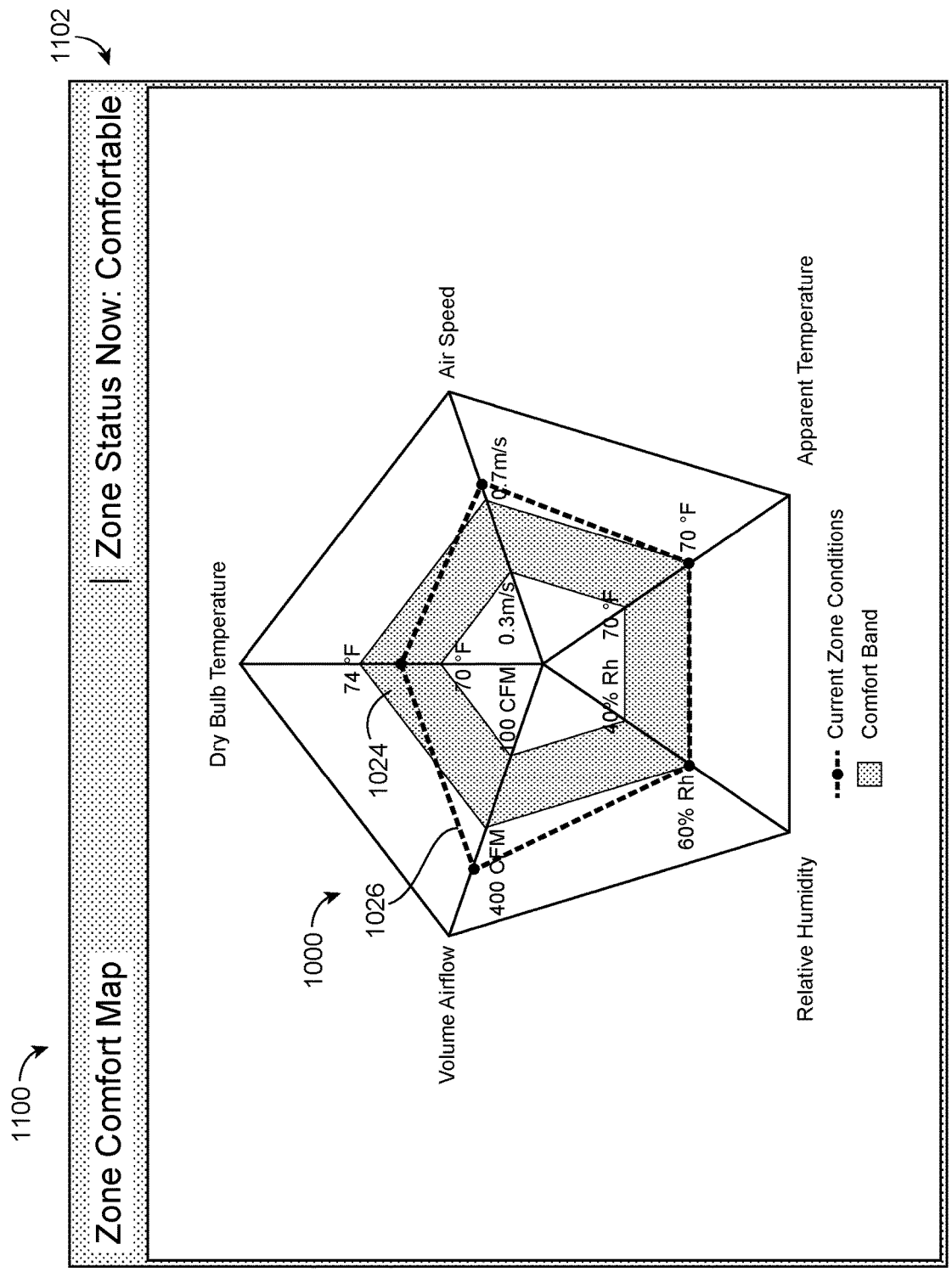
FIG. 11 is an illustration of a graphical user interface widget that includes a first instance of the comfort map of FIG. 10, according to an exemplary embodiment.
Figure 12:
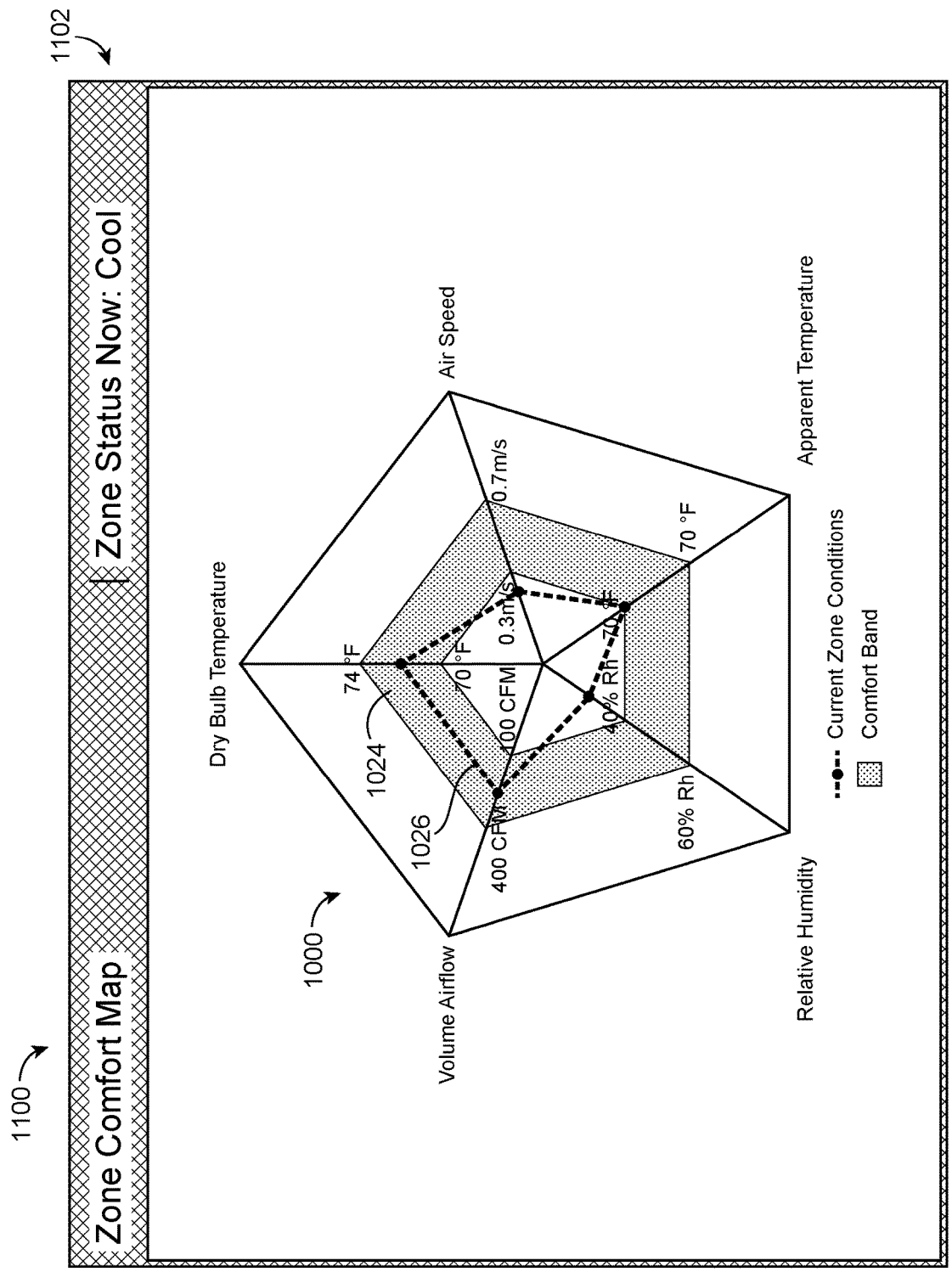
FIG. 12 is illustration of a graphical user interface widget that includes a second instance of the comfort map of FIG. 10, according to an exemplary embodiment.
Figure 13:
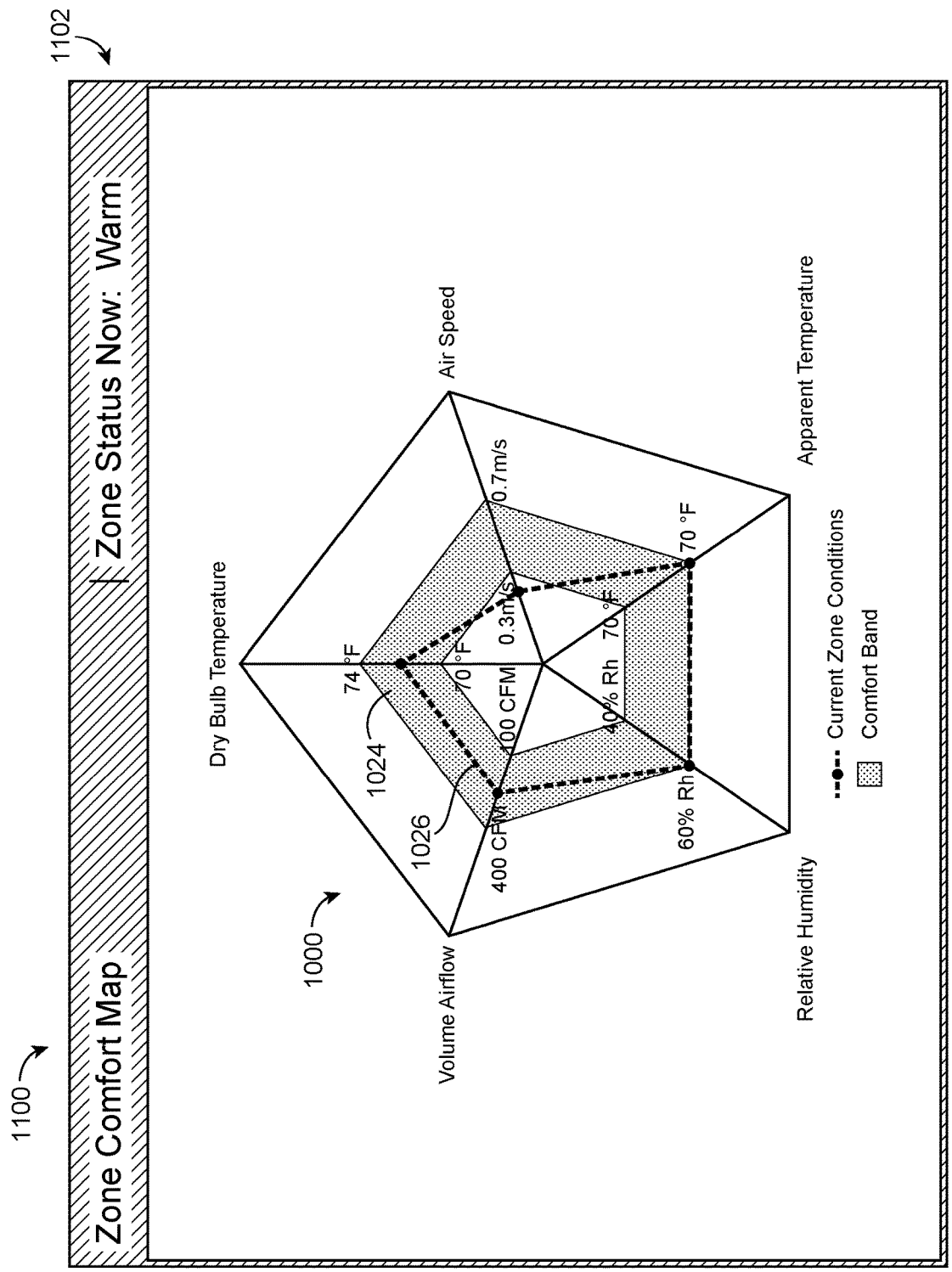
FIG. 13 is illustration of a graphical user interface widget that includes a third instance of the comfort map of FIG. 10, according to an exemplary embodiment.

Referring now to FIGS. 11-13, a widget 1100 for a graphical user interface is shown, according to exemplary embodiments. FIGS. 11-13 show the widget 1100 at various times (i.e., with various values of the parameters considered in process 600). The widget 1100 may be presented on one or more of a variety of graphical user interfaces on a variety of devices. For example, the widget 1100 may be presented on a client device (e.g., laptop, desktop, tablet) as part a BMS or enterprise management system. The widget 1100 may also be presented in a mobile application on a smartphone. The widget 1100 may also be presented on a digital display of a thermostat.

The widget 1100 includes the visualization 1000 and a status bar 1102. The status bar 1102 indicates a current zone comfort for the zone (e.g., comfortable, cool, warm), for example by stating the current zone comfort in words (e.g., "Comfortable" as in FIG. 11, "Cool" as in FIG. 12, "Warm" as in FIG. 12). The status bar 1102 may change colors based on the current zone comfort (e.g., green for comfortable, blue for cool, orange for warm).

As shown in FIG. 11, the pentagonal perimeter 1026 is positioned partially outside of the band 1024. This may indicate that the zone is not in an ideal status or ideally comfortable, and may indicate how the zone could be managed to improve comfort (e.g., by increasing volume airflow and air speed to bring the pentagonal perimeter 1026 into the band 1024). However, the pentagonal perimeter 1026 as shown in FIG. 11 is similar in shape to the band 1024, which may indicate that the zone is still comfortable as indicated by the status bar 1102.

As shown in FIG. 12, the widget 1100 indicates that building zone is cool. That is, the widget 1100 indicates that an occupant in the building zone would feel cooler than is comfortable for the occupant. In the example of FIG. 12, the zone is cool despite a dry bulb temperature positioned within the band 1024 (shown as 72 degrees Fahrenheit). In a traditional HVAC system that focuses on dry bulb temperature, a user may have difficulty identifying why the zone feels cool when the dry bulb temperature is at an acceptable value. The widget 1100 and the visualization 1000 provide a user with a single view of the other factors that are causing the zone to be cool, as the pentagonal perimeter 1026 is positioned largely inside of the band 1024 and has a skewed shape relative to an ideal regular polygon. For example, the visualization 1000 indicates that the current humidity in the zone is low. The humidity of the zone may then be increased to increase comfort of the room. In a situation where no humidifier is available in the zone, the widget 1100 as shown in FIG. 12 may indicate to a user that installing a humidifier may be more effective and efficient at improving comfort than attempting to increase the dry bulb temperature.

As shown in FIG. 13, the widget 1100 indicates that the zone is warm. The status bar 1102 includes the word "Warm" and may be colored orange, red, yellow, etc. to indicate warmth. The pentagonal perimeter 1126 shows that the humidity, the air speed, and the apparent temperature are relatively high, causing the zone comfort to be warm. The widget 1100 thereby indicates that increasing the air speed or decreasing the humidity would improve comfort of the zone. The widget 1100 may thereby facilitate the reduction of energy consumption by encouraging lower-cost solutions to zone discomfort, for example by indicating that a user should turn on a fan for the zone rather than placing a more significant load on a chiller or other air conditioning system.

Figure 14:
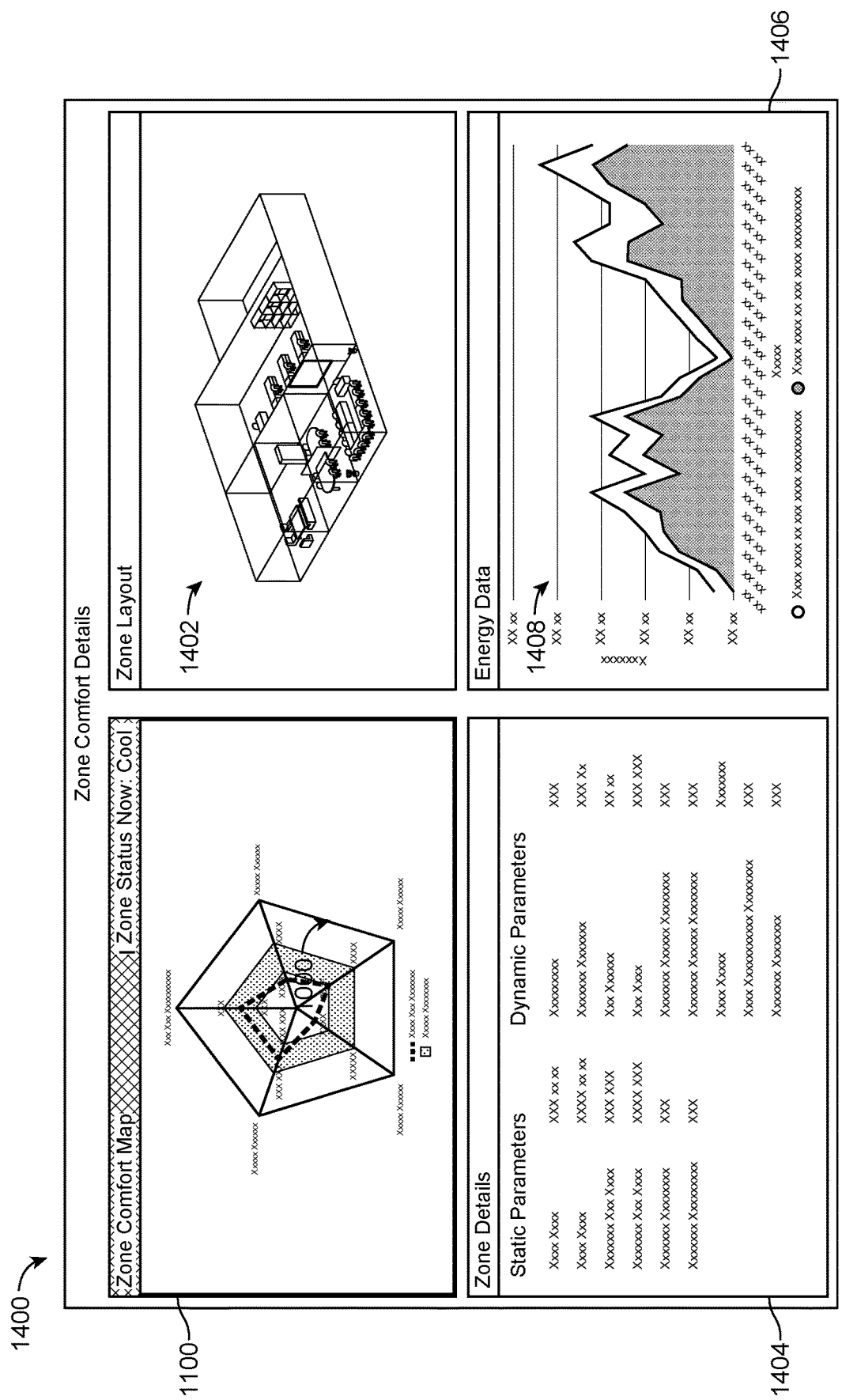
FIG. 14 is an illustration of a zone management dashboard that includes the widget of FIG. 11, according to an exemplary embodiment.

Referring now to FIG. 14, a zone management dashboard 1400 is shown, according to an exemplary embodiment. The zone management dashboard 1400 may be part of a graphical user interface for a BMS, an energy management system, or some other enterprise management system. The zone management dashboard 1400 includes the widget 1100 of FIGS. 11-13. The zone management dashboard 1400 also includes a three-dimensional model 1402 showing the layout of the zone. The zone management dashboard 1400 also includes a zone details widget 1404 that lists current data about the zone, including static parameters (e.g., zone area, zone volume) and dynamic parameters (e.g., current dry bulb temperature, current apparent temperature). The zone management dashboard 1400 also includes an energy data widget 1406 that shows a graph 1408 of energy consumption over a time period. The graph 1408 may indicate an energy consumption associated with controlling equipment using the dry bulb air temperature as well as an energy consumption associated with controlling equipment using the apparent temperature. The energy data widget 1406 may thereby indicate the amount of energy saved by using the apparent temperature as in process 600.

Configuration of Exemplary Embodiments

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, calculation steps, processing steps, comparison steps, and decision steps.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

What is claimed is:

1. A building management system, comprising:
   a dry bulb temperature sensor;
   a humidity sensor;
   an airflow meter; and
   a controller configured to:
      calculate an apparent temperature using a dry bulb temperature obtained by the dry bulb temperature sensor, a relative humidity obtained by the humidity sensor, and an airflow rate obtained by the airflow meter;
      generate a visualization of zone comfort, the visualization comprising a comfort band and current values of the apparent temperature, the dry bulb temperature, the relative humidity, and the airflow rate plotted relative to the comfort band along independent axes; and
      control building equipment to drive the current values of one or more of the apparent temperature, the dry bulb temperature, the relative humidity, and the airflow rate into the comfort band.

2. The building management system of claim 1, wherein the comfort band defines a range of comfortable values for each of the dry bulb temperature, the relative humidity, the airflow rate, and the apparent temperature.

3. The building management system of claim 1, wherein the visualization comprises a pentagonal chart, wherein:
   each corner of the pentagonal chart corresponds to a parameter;
   each corner is joined to a center of the pentagonal chart by a corresponding axis of the independent axes on which a current value of the corresponding parameter is plotted; and
   a polygonal perimeter connects the current values of the parameters.

4. The building management system of claim 3, wherein the parameters comprise the apparent temperature, the dry bulb temperature, the relative humidity, air speed, and the airflow rate.

5. The building management system of claim 3, wherein the comfort band is formed as a polygonal band such that the polygonal perimeter is within the comfort band when the current values of the parameters are within the comfort band.

6. The building management system of claim 1, wherein the controller is configured to execute a machine learning process to automatically modify the comfort band based on occupant behavior.

7. The building management system of claim 1, wherein the controller is configured calculate the apparent temperature using a formula comprising scaling parameters, and wherein the controller is configured to automatically tune the scaling parameters using a machine learning approach.

8. The building management system of claim 1, wherein the controller is configured to control the building equipment to drive the current values of one or more of the apparent temperature, the dry bulb temperature, the relative humidity, and the airflow rate into the comfort band by:
determining, from a set of possible adjustments, a combination of adjustments of the dry bulb temperature, the relative humidity, and air speed that minimize energy consumption while achieving a desired apparent temperature.

9. The building management system of claim 1, wherein the controller is configured to calculate the apparent temperature using a look-up table that maps values of the dry bulb temperature, the relative humidity, and the airflow rate to values of the apparent temperature.

10. The building management system of claim 1, wherein the airflow meter is configured to obtain the airflow rate based on settings for a variable air volume unit.

11. A method for providing environmental comfort, comprising:
obtaining measurements of a dry bulb temperature, a relative humidity, and an airflow rate for an indoor space;
calculating an apparent temperature for the indoor space using the measurements;
generating a visualization comprising a comfort band and a value of each of the apparent temperature, the dry bulb temperature, the relative humidity, and the airflow rate for the indoor space plotted relative to the comfort band along independent axes; and
controlling building equipment to drive the value of one or more of the apparent temperature, the dry bulb temperature, the relative humidity, or the airflow rate into the comfort band.

12. The method of claim 11, wherein the comfort band defines a range of comfortable values for each of the dry bulb temperature, the relative humidity, the airflow rate, and the apparent temperature.

13. The method of claim 11 wherein generating the visualization comprises generating a pentagonal chart, wherein:
each corner of the pentagonal chart corresponds to a parameter;
each corner is joined to a center of the pentagonal chart by an axis on which a current value of the corresponding parameter is plotted; and
a polygonal perimeter connects current values of the parameters.

14. The method of claim 13, wherein the parameters comprise the apparent temperature, the dry bulb temperature, the relative humidity, air speed, and the airflow rate.

15. The method of claim 14, wherein the comfort band is formed as a pentagonal band such that a pentagonal perimeter is within the comfort band when the current values of the parameters are within the comfort band.

16. The method of claim 11, wherein controlling the building equipment to drive current values of one or more of the apparent temperature, the dry bulb temperature, the relative humidity, and the airflow rate into the comfort band comprises:
determining, from a set of possible adjustments, a combination of adjustments of the dry bulb temperature, the relative humidity, and air speed that minimizes energy consumption while achieving a desired apparent temperature.

17. One or more non-transitory computer-readable media containing program instructions that, when executed by one or more processors, cause the one or more processors to perform operations comprising:
obtaining measurements of a dry bulb temperature, a relative humidity, and an airflow rate for an indoor space;
calculating an apparent temperature for the indoor space using the measurements;
generating a visualization comprising a comfort band and a value of each of the apparent temperature, the dry bulb temperature, the relative humidity, and the airflow rate for the indoor space plotted relative to the comfort band along independent axes; and
controlling building equipment to drive the value of one or more of the apparent temperature, the dry bulb temperature, the relative humidity, or the airflow rate into the comfort band.

18. The non-transitory computer-readable media of claim 17, wherein the comfort band defines a range of comfortable values for each of the dry bulb temperature, the relative humidity, the airflow rate, and the apparent temperature.

19. The non-transitory computer-readable media of claim 17, wherein generating the visualization comprises generating a pentagonal chart, wherein:
each corner of a pentagonal chart corresponds to a parameter;
each corner is joined to a center of the pentagonal chart by a corresponding axis of the independent axes on which a current value of the corresponding parameter is plotted; and
a polygonal perimeter connects current values of the parameters.

20. The non-transitory computer-readable media of claim 19, wherein the parameters comprise the apparent temperature, the dry bulb temperature, the relative humidity, air speed, and the airflow rate; and
wherein the comfort band is formed as a pentagonal band such that the polygonal perimeter is within the comfort band when the current values of the parameters are within the comfort band.

21. The non-transitory computer-readable media of claim 17, wherein controlling the building equipment to drive the value of one or more of the apparent temperature, the dry bulb temperature, the relative humidity, or the airflow rate into the comfort band comprises:
first affecting the airflow rate and determining whether the affecting the airflow rate is sufficient to move the apparent temperature into the comfort band;
in response to determining that the affecting the airflow rate is not sufficient to move the apparent temperature into the comfort band, then controlling the building equipment to affect the dry bulb temperature or the relative humidity.

* * * * *